United States Patent Office 2,861,069
Patented Nov. 18, 1958

2,861,069

METHOD OF PREPARING CELLULOSE ESTERS

George P. Touey and John E. Kiefer, Kingsport, Tenn., assignors to Eastman Kodak Company, Rochester, N. Y., a corporation of New Jersey No Drawing. Application March 21, 1957
Serial No. 647,500

8 Claims. (Cl. 260—227)

This invention relates to the preparation of lower fatty acid esters of cellulose in which insoluble polymeric sulfonic acids are employed as the catalysts for the esterification.

In the usual preparation of lower faty acid esters of cellulose, sulfuric acid is the catalyst employed. This acid is very effective in that it promotes the desired esterification of the cellulose under relatively mild conditions but it has the disadvantage of that it combines with cellulose and the collulose ester obtained often contains sulfur acid radicals. Ordinarily these sulfate groups can be removed from the final product by a prolonged hydrolysis under very carefully controlled conditions. However, even after this treatment, the product may contain sufficient combined sulfuric acid to render it unstable to prolonged heating at elevated temperatures such as may be encountered in molding operations or the like.

In order to eliminate this disadvantage which may be encountered when sulfuric acid catalyst is employed, various so-called "non-combining" acids have been suggested as catalysts in cellulose esterification processes. Perchloric acid is an example of such an acid catalyst. However, perchloric acid has several disadvantages when used as a catalyst. For instance it is corrosive on stainless steel equipment. It is explosive in contact with readily oxidizable materials. It is soluble in water and in the esterifying solution, and hence cannot be separated therefrom. Recovery of the acid from the spent esterification mass by a distillation procedure is practically impossible due to the dangerous nature of perchloric acid.

Other strong acid catalysts such as phosphoric acid, hydrochloric acid, methane sulfonic acid, toluene sulfonic acid and the like have also been disclosed as useful noncombining catalysts in the esterification of cellulose. In addition weak salts of strong acids such as zinc chloride, ammonium sulfates and the like have been suggested. All of these compounds are soluble both in the reaction mixture and in water. Hence, they are only recoverable, such as from the precipitating bath, by distillation. When a cellulose derivative is precipitated from a reaction dope containing a dissolved acid or acid salt catalyst, it is difficult to remove the last traces of the catalyst therefrom. Even after prolonged soaking in water the product may contain enough absorbed catalyst to be unstable to heat and storage.

One object of our invention is to provide a method for producing thermally stable lower fatty acid esters of cellulose. Another object of our invention is to provide an insoluble acid type catalyst for cellulose esterification processes. A further object of our invention is to provide a catalyst for esterification processes which catalyst does not combine with the cellulose. A still further object of our invention is to provide an acid type catalyst for cellulose esterification processes which can be readily and completely removed from the cellulose ester and the esterifying liquor by a sample filtration step.

A still further object of our invention is to provide a cellulose ester catalyst which after recovery can be re-used without any regeneration procedures. Other objects of our invention will appear herein.

We have found that, by employing insoluble polymeric type sulfonic acids as catalysts for the esterification of cellulose to form lower fatty acid esters thereof, the various disadvantages which reside in the use of soluble acid catalysts are eliminated. The insoluble polymeric type sulfonic acids which we have found to be particularly suitable as catalysts in the manufacture of lower fatty acid esters of cellulose are those which are ordinarily known as sulfonic acid type ion exchange resins. They contain the active sulfonic acid radicals chemically bound to a cross linked polymeric structure. Normally they are of one of the following two types:

I. Sulfonated copolymers of styrene and divinyl benzene

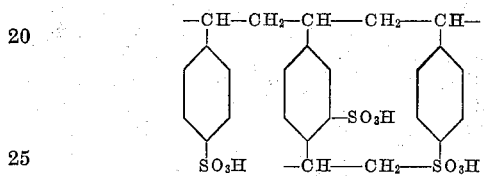

II. Sulfonated condensation polymers of phenol and formaldehyde.

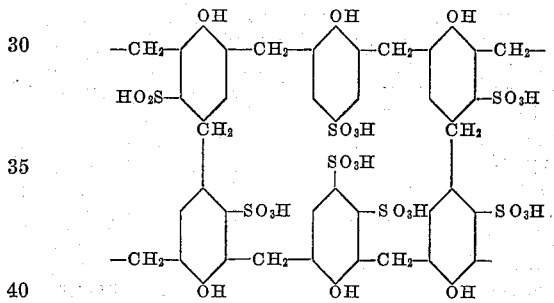

Sulfonic acid type ion exchange resins can be described as high molecular weight poly acids which are insoluble in aqueous and nonaqueous media. They comprise an insoluble cross-linked back-bone polymeric structure to which are fixed sulfonic acid groups which present hydrogen ions. The number of sulfonic acid groups present in the ion exchange resin determine its effectiveness as a catalyst along with the size of the insoluble resin. Although these two factors can vary over a relatively wide range and the resin will still exhibit catalytic properties the more are those described in U. S. Patent No. 2,366,007 of D'Alelio and the sulfonic acid ion exchange resins described in chapter 5 of the book entitled "Ion Exchange Resins" by Kunin and Meyers (John Wiley and Sons, 1950).

If the catalyst employed consists of fine mesh size particles, more rapid reaction rates may be obtained. However, with decrease of the particle size of the resin the ease of filtration of the catalyst from the completed esterification mass diminishes. Therefore, it appears that in practical operations, it is desirable to use a catalyst material no finer than 200 mesh to avoid difficulties in filtering off the catalytic resin. If removal of the catalyst is not a factor, finer mesh catalysts may be employed, with good effect.

In esterifying cellulose with lower fatty acid anhydrides in accordance with our invention it is desirable that the cellulose be in a form that it can be well dispersed in the esterifying liquid. For instance, loose fibers of cellulose or powdered cellulose are preferred for such reactions because they are easily slurried in the esterifying bath containing the dispersed sulfonic acid ion exchange resin. Such fibers can be readily prepared by grinding or pulverizing refined wood pulp or cotton linters until they are capable of passing through a screen of 20 mesh or finer. The catalysts in accordance with our invention are also useful in esterification processes which involve the esterification of cellulose compounds containing free and esterifiable hydroxyl groups. For instance, partially substituted cellulose esters or cellulose ethers can be esterified by lower fatty acid anhydrides and the reaction catalyzed by sulfonic acid polymeric materials as described herein. Some cellulose esters to the preparation of which the use of sulfonic acid type polymeric catalytic agents is particularly adapted are cellulose acetate propionate, cellulose acetate butyrate, cellulose propionate and cellulose butyrate.

In the preparation of cellulose esters in accordance with our invention, the procedure ordinarily used consists of heating an activated cellulose at 60–120° C. for 2–10 hours in an esterification bath containing an organic acid anhydride, a diluent and as the catalyst a suspension of the sulfonic acid type resin. The amounts of anhydride and diluent will depend upon the type of ester being prepared. The diluent employed ordinarily is the acid corresponding to the anhydride. Other diluents, however, which are solvents for the final product can be used. Thus, diluents such as esters or chlorinated hydrocarbons may be employed. The amount of ion exchange catalyst employed to give a satisfactory product within a reasonable length of time is ordinarily within the range of 5–50% based on the weight of the cellulose. The factors determining the amount of catalyst are the type of ester being prepared, the concentration of the anhydride, the temperature maintained and the degree of fineness of the cellulose and the ion exchange resin. Excellent results are obtained in preparing lower fatty acid esters of cellulose using the following range of conditions:

1 part of comminuted cellulose capable of passing through a 30 mesh screen which cellulose has been activated such as by soaking in water and removing the water with a lower fatty acid;

3–8 parts of lower fatty acid anhydride;

5–8 parts of propionic acid or butyric acid or a mixture of those acids;

0.1–0.5 part of a sulfonic acid exchange resin capable of passing through 100 mesh screen, reacted together for 2–3 hours at 80–90° C. with agitation.

Some sulfonic acid ion exchange resins containing between 0.5 and 1.2 sulfonic groups per benzene nucleus which are satisfactory catalysts for esterifying cellulose under the described conditions which are commercially available at the present time are: Divinyl benzene-styrene backbone polymer; phenol formaldehyde backbone polymer.

The following examples illustrate our invention:

Example 1

1 part of refined alpha cellulose wood pulp ground sufficiently to pass through a 40-mesh screen was soaked for two hours in acetic acid at 25° C. The pulp was filtered to a weight of 2.6 parts and was then added to a mixture of 2.9 parts of acetic acid, 3.5 parts of acetic anhydride and 0.20 part of a sulfonic acid type ion exchange resin. The mixture was stirred at 80° C. for two hours whereupon the pulp was found to have dissolved and formed a clear viscous dope with the resin particles in suspension. The dope was filtered through a stainless steel screen to remove the catalyst and was precipitated in water and water washed. The cellulose acetate was obtained in the form of a white powder having an acetyl content of 44.1% and was soluble in cellulose triacetate solvents. Although the product was heated for 24 hours at 190° C. it retained its whiteness and showed no signs of decomposition. In contrast, a comparable cellulose acetate prepared using sulfuric acid catalyst when heated to 190° C. turned brown in three hours.

Example 2

1 part of refined wood pulp which had been ground to pass through a 40 mesh screen was soaked for two hours in acetic acid at 25° C. The pulp was filtered to 2.8 parts and was added to a mixture of 2.7 parts of acetic acid, 3.5 parts of acetic anhydride and 0.20 part of the resin catalyst which had been filtered from the reaction dope of Example 1. The mass was agitated and heated at 80° C. for two hours whereupon a clear viscous dope with the particles in suspension was formed. This dope was filtered, precipitated into water and water washed. A white cellulose acetate product containing 43.8% acetyl was obtained. It was soluble in cellulose triacetate solvents and was stable upon heating at 190° C. for 24 hours. This product had an intrinsic viscosity of 1.5.

Example 3

1 part of refined wood pulp ground to pass through a 40 mesh screen was soaked for 2 hours in propionic acid at 25° C. The pulp was filtered to 2.5 parts and was added to a mixture of 2.5 parts of propionic acid, 5 parts of propionic anhydride and 0.30 part of a sulfonic acid resin of the phenol formaldehyde backbone polymer type. The mass was mixed at 90° C. for 2½ hours. A clear dope of cellulose acetate was obtained which was filtered to remove the catalyst and was then precipitated into water and water washed. The product contained 50.1% propionyl and was soluble in cellulose propionate solvents. Its intrinsic viscosity was 1.4.

Example 4

1 part of refined ground wood pulp was soaked for two hours in normal butyric acid at 25° C. The pulp was filtered to 2.9 parts and was added to a mixture of 2.1 parts of normal butyric acid, 6 parts of normal butyric anhydride and 0.35 part of sulfonic acid resin of the divinyl benzene-styrene backbone polymer type in divided condition. The mass was mixed at 90° for 2¾ hours. The catalyst was removed by filtration and the product was precipitated into water and water washed. The cellulose butyrate obtained had a butyryl content of 55.6% and was soluble in cellulose butyrate solvents.

We claim:

1. A method of preparing lower fatty acid esters of cellulose which comprises esterifying a cellulose compound having esterifiable hydroxyl groups with an esterifying bath comprising an organic acid anhydride, a diluent and an insoluble sulfonic acid resin catalyst.

2. A method of preparing a lower fatty acid ester of celluose which comprises reacting upon cellulose with an esterification bath comprising an organic acid anhydride, a diluent and as the catalyst, a sulfonated copolymer of styrene and divinyl benzene.

3. A method of preparing a lower fatty acid ester of celluose which comprises reacting upon cellulose with an esterification bath comprising an organic acid anhydride, a diluent and as the catalyst, a sulfonated condensation polymer of phenol and formaldehyde.

4. A method of preparing a lower fatty acid ester of cellulose which comprises reacting upon cellulose with an esterification bath comprising a lower fatty acid anhydride, a diluent and as the catalyst, a water insoluble sulfonated polymer of a mixture comprising a polyvinyl aryl compound and a monovinyl aryl compound.

5. A method of preparing a lower fatty acid ester of cellulose which comprises reacting upon cellulose with an esterification bath comprising a lower fatty acid anhydride, a diluent and as the catalyst a sulfonated condensation polymer of a phenol and an aldehyde.

6. A method of preparing cellulose acetate which comprises reacting upon cellulose with an esterification bath comprising acetic anhydride, acetic acid diluent and as the catalyst a resin selected from the group consisting of the sulfonated copolymers of styrene and divinyl benzene and the sulfonated condensation polymers of phenol and formaldehyde.

7. A method of preparing a butyric acid ester of cellulose which comprises reacting upon cellulose with an esterification bath comprising butyric anhydride, a lower fatty acid diluent and as the catalyst a resin selected from the group consisting of the sulfonated copolymers of styrene and divinyl benzene and the sulfonated concentration polymers of phenol and formaldehyde.

8. A method of preparing propionic acid esters of cellulose which comprises reacting upon cellulose with an esterification bath comprising propionic anhydride, a lower fatty acid diluent and as the catalyst a resin selected from the group consisting of the sulfonated copolymers of styrene and divinyl benzene and the sulfonated concentration polymers of phenol and formaldehyde.

References Cited in the file of this patent

UNITED STATES PATENTS

| | | |
|---|---|---|
| 2,024,381 | Muller et al. | Dec. 17, 1935 |
| 2,031,657 | Jones | Feb. 25, 1936 |
| 2,072,261 | Haney | Mar. 2, 1937 |
| 2,355,712 | Drefus | Aug. 15, 1944 |
| 2,746,938 | Ehm et al. | May 22, 1956 |

FOREIGN PATENTS

| | | |
|---|---|---|
| 405,884 | Great Britain | Feb. 15, 1934 |

OTHER REFERENCES

Chemical and Engineering News, Feb. 21, 1949, page 557.

Nachod: "Ion Exchange," Academic Press Inc., New York, N. Y., pp. 266–268, Sections 1–4 (1949).

Sussman: "Industrial and Engineering Chemistry," 38, pp. 1228–1230 (1946).

Kunin et al.: "Ion Exchange Resins," John Wiley & Sons, 1950, pp. 137–139, Section on Catalysis.